May 5, 1959  C. H. FRICK  2,884,807
POWER PLANT CONTROL MECHANISM
Filed June 1, 1955  4 Sheets-Sheet 1

INVENTOR
Charles H. Frick
BY
J. C. Thorpe
ATTORNEY

May 5, 1959

C. H. FRICK 2,884,807

POWER PLANT CONTROL MECHANISM

Filed June 1, 1955

INVENTOR
Charles H. Frick
BY
J. C. Thorpe
ATTORNEY

United States Patent Office 2,884,807
Patented May 5, 1959

2,884,807
POWER PLANT CONTROL MECHANISM

Charles H. Frick, Pontiac, Mich., assignor to General Motors Corporation, Detroit, Mich., a corporation of Delaware Application June 1, 1955, Serial No. 512,445

20 Claims. (Cl. 74—665)

This invention relates generally to a control mechanism for a power plant and more particularly to a power plant including an engine adapted to drive a plurality of load mechanisms.

A principal object of the invention is to provide a control mechanism for a power plant which is responsive to load connecting means associated therewith to vary the controlled minimum idling speed of the power plant in accordance with the load mechanisms connected thereto to prevent stalling.

Another principal object of the invention is to provide a power plant control mechanism including a limiting-speed governor mechanism adapted to control the minimum and maximum operating speeds of the power plant and means provided externally of the governor mechanism whereby the minimum speed limit controlled by the governor mechanism is effectively varied in accordance with the driving connection provided for the power plant.

It is also an object of the invention to provide a power plant adapted to drive a primary load mechanism and a plurality of accessory load mechanisms through drive connections established through at least two independently operable transmissions with improved control mechanism adapted to advance the minimum idle speed of the power plant when certain of the accessory load mechanisms are being driven by the power plant, normally limiting operation of the power plant to idle speed when the power plant is solely driving such accessory mechanisms, and permitting a lower power plant idle speed when such accessory mechanisms are not drivingly connected to the power plant.

A further and more specific object of the invention is to provide an improved control mechanism for a power plant including an engine, a primary transmission mechanism adapted to connect the engine to a primary load, secondary transmission mechanism adapted to connect the engine to at least one secondary load, and means for independently establishing driving connections through each of the transmission mechanisms, the control mechanism comprising, in combination, a fuel control means, manual throttle control means operably connected to the fuel control means and movable between an idle and a full throttle position, governor means associated with the fuel control means and operable to limit maximum and minimum speeds of the engine, governor control means responsive to the drive connection establishing means for controlling the minimum speed setting of the governor in accordance with loads drivingly connected to the engine, and means operable in response to the drive connection establishing means in one operative position thereof to render the manual throttle control means inoperative to shift the fuel control means from its engine idle position.

Also among the objects of the invention is to provide an improved control mechanism for a multi-engine power plant similar to that shown in the copending United States patent application Serial No. 427,005, entitled "Transmission and Control System" and filed May 3, 1945, in the name of Hans O. Schjolin, in which one or more engines are adapted to independently and collectively drive a conveyance such as a motor bus or truck and at least one of the engines is adapted to drive a compressor mechanism for supplying air conditioning or refrigeration independently of the conveyance drive. While the invention has particular application to control mechanism for such a conveyance power plant, its use is not so limited, being considered applicable to power plant control mechanism generally.

In internal combustion engine power plants utilized as the propelling means of a conveyance, it is desirable to limit the maximum permissible engine speed to thereby limit the maximum speed of the conveyance. It is also desirable to limit the minimum speed of each engine so that the power plant will not stall under accessory loading during idling periods of engine operation when the conveyance is at a standstill. A number of these accessory loads such as cooling fans, lubricant and cooling water pumps, charging blowers, etc. which are essential to normal engine operation will be continuously driven by the power plant. However, in modern conveyances such as vehicles and aircraft, the number and load capacity of accessory load mechanisms adapted to be selectively driven by the power plant have also increased to the point where the accessory load requirements which may be placed on the engine during normal idle operation would normally droop the engine speed below its stall point and cause the engine to stop.

The instant invention is directed to a control mechanism adapted to limit the minimum and maximum speeds of the engine and includes means for modifying the minimum speed-limiting characteristics of such control mechanism in accordance with the loads imposed on the engine during engine idle periods to thereby prevent engine stalling. To this end the invention contemplates the use of a servomechanism which is operable to effectively vary minimum speed-establishing bias of an engine governing means in accordance with the load connection provided by drive connection establishing means associated with the power plant.

The foregoing and other objects and features of the invention will be more thoroughly understood from the following description of a preferred embodiment of the invention in which reference is made to the accompanying drawings, in which.

Figure 1:
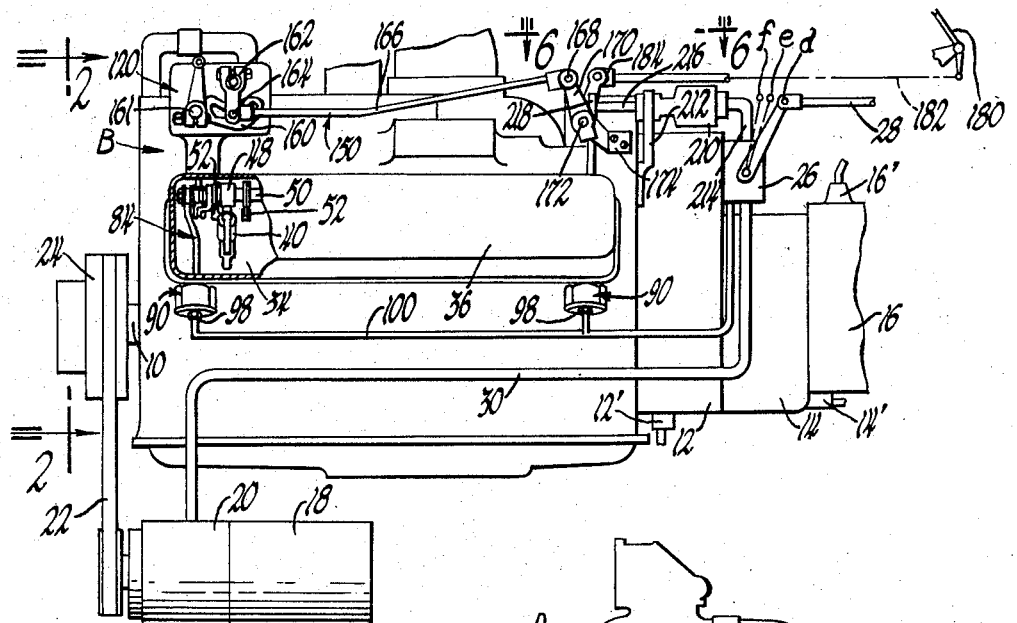
Figure 1 is a somewhat diagrammatic side elevational view of a twin engine power plant embodying the control mechanism of the invention.
Figure 2:
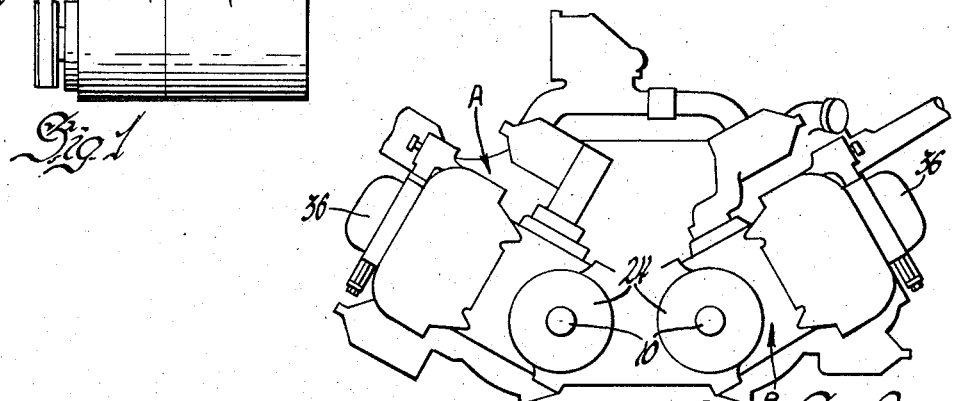
Figure 2 is a front elevational view of reduced scale showing the power plant taken in the direction of the arrows 2—2 of Figure 1.

Referring more particularly to the drawings, Figures 1 and 2 illustrate a twin engine power plant similar to that shown and described in the aforementioned S.N. 427,005 application. This power plant includes two radially disposed inline engines A and B having a common interconnecting crankcase. The engines each have separate crankshafts 10, 10 which are operably interconnectable through primary transmission mechanism to individually or collectively drive a primary load mechanism, not shown, such as a propeller drive shaft of a vehicle. The primary transmission mechanism includes a torque converter and transfer gear mechanism 12, a two-speed clutch mechanism 14, a two-speed auxiliary overdrive-type transmission 16, and suitable drive connection establishing controls such as shown and described in the aforementioned patent application. These controls include suitable speed ratio selecting means 14' and 16' for the clutch mechanism 14 and the auxiliary transmission 16, respectively, and a torque converter control 12' so arranged that when only one of the engines is operating, the torque converter of the nonoperating engine is operably disconnected from the transfer gear mechanism.

In addition to the primary load driving connection provided by the primary transmission mechanism, the power plant is also drivingly connectable to a secondary or accessory load mechanism 18 such as a compressor for air conditioning or refrigeration or a generator through a two-speed secondary transmission mechanism 20 and a suitable drive connection such as a belt, gear, or chain drive, generally indicated at 22. The driving connection 22 may be between either one or both of the engines and the accessory driving transmission mechanism 20. Where it is desired to drive the accessory load mechanism 18 by either of the engines A or B, the drive connection 22 should necessarily include overrunning clutch mechanism preferably incorporated into the crankshaft-mounted pulleys 24 of the two engines.

Speed ratio and drive establishing control means for the secondary transmission mechanism 20 includes a control valve 26 which is operable through an operator controlled linkage 28 to connect the secondary transmission mechanism 20 to a source of fluid pressure, not shown, such as an engine-driven lubrication supply pump, through fluid conduit 30. The manually controlled linkage 28 is operable between control position d, e, and f which correspond to control valve positions for establishing normal or direct drive, neutral or no drive, and overdrive operation through the transmission mechanism 20.

Figure 3:
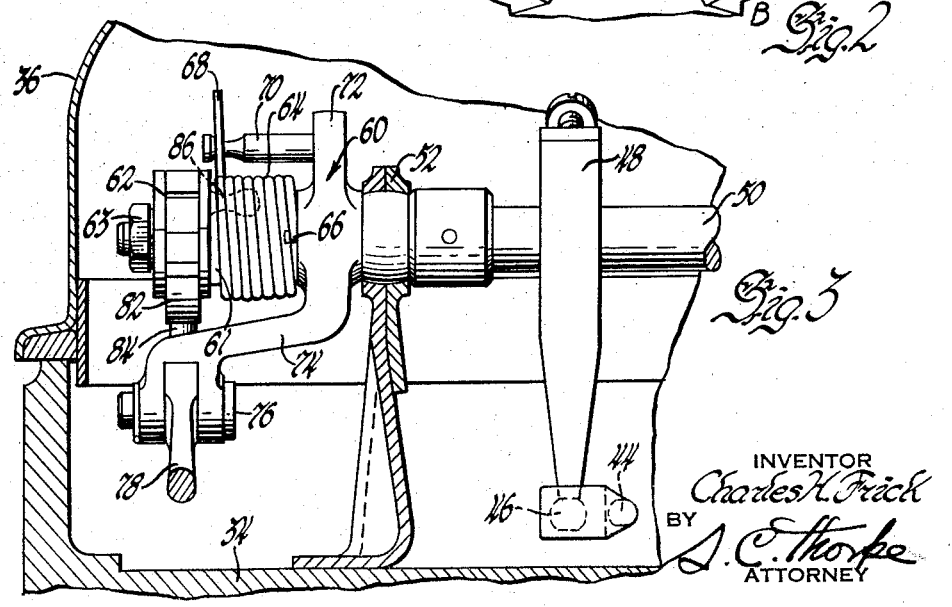
Figure 3 is a fragmentary sectional view taken substantially on the line 3—3 of Figure 4.
Figure 4:
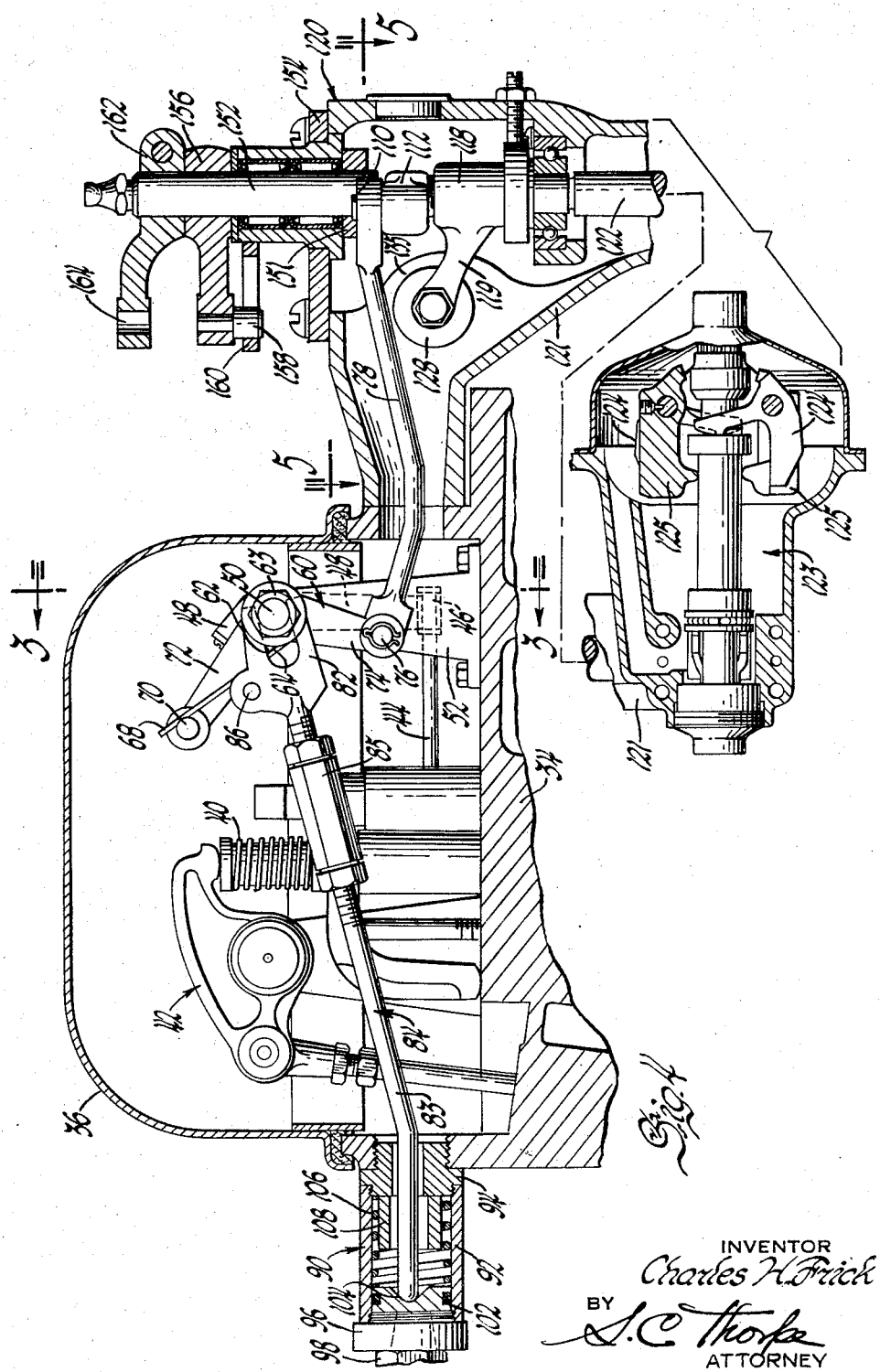
Figure 4 is a fragmentary vertical section of a portion of the control mechanism.

Each engine of the power plant is provided with identical fuel control means operable to control the fuel supply of the engine and thereby engine speed. As best seen in Figures 3 and 4, this fuel control means includes a unit injector 40 for each of the engine cylinders. The injectors 40 are mounted in the cylinder head 34 beneath the head cover 36 and are individually operable in timed sequence by conventional actuating mechanisms, generally indicated at 42. The quantity of fuel supplied by each of the injectors 40 is controllable by the rotation of a pinioned plunger or spindle, not shown, by an injector rack 44 in a conventional manner. The end of each injector rack 44 remote from the injector 40 has a pivotal tongue-and-groove connection 46 with a lever 48 secured to an injector control tube or shaft 50 rotatably mounted on the cylinder head 34 by brackets 52.

A bell crank lever 60, a spring guide sleeve 61, and an annularly grooved member 62 are nonrotatably mounted on each end of the injector control shaft 50 in outboard sequence and retained thereon by the washer-locked nut 63. The spring guide sleeve 61 serves as an internal guide for a helically wound torsion spring 64, one end of which is secured to the sleeve at 66. The opposite end 68 of the torsion spring 64 is adapted to abut a pin 70 carried by one arm 72 of the lever 60 with a predemined spring force. It will be understood that when the spring 64 is in abutment with the pin 70, no biasing effect will be imparted to the shaft 50 since both ends of the spring are effectively carried by the shaft.

A second lever arm 74 of the lever 60 mounted on one end of each control shaft 50 is pivotally connected at 76 to fuel supply control member 78, while a corresponding lever arm of the lever mounted on the opposite end of each shaft may be connected to suitable means, not shown, independently operable to rotate each injector control shaft to a no-fuel position to insure engine shutdown on a selective basis.

The annularly grooved member 62 mounted on each end of the shaft 50 serves as a crosshead slidably mounting a bifurcated member 82 forming one end of a longitudinally shiftable link 84. The opposite end of the link 84 is a rod member 83 which is connected to the member 82 by a nut-locked turnbuckle 85. A fluid-operated expansible chamber servo mechanism mounted on an upstanding flange adjacent each end of the cylinder head 34 is operable to cause the longitudinal shifting of link 84 to move a pin 86 carried by the member 82 into and out of engagement with the torsion spring end 68 in accordance with the drive connection established through the secondary transmission mechanism 20 by the control valve 26. Movement of link 84 bringing the pin 86 into engagement with spring end 68 moves the spring end 68 out of abutment with the lever-carried pin 70 thereby causing the spring 64 to apply a couple to the injector control shaft in a fuel-increasing direction.

As best seen in Figure 4, the servo mechanism 90 includes a cylinder 92 which is mounted on the cylinder head flange by a center-perforated mounting member 94 which extends through an opening provided in the head flange. The opposite end of the cylinder is closed by a head member 96 having a fluid inlet fitting 98 mounted therein which is connectable through a conduit 100 to the accessory drive control valve 26 and thereby to a fluid pressure source. An O-ring sealed piston 102 reciprocably mounted in the cylinder 92 is provided with a semi-spherical seat 104 for the mating end of link rod 83 which extends into the cylinder through the center perforation of the mounting member 94. A helical spring 106 interposed between the mounting member 94 and the piston 102 normally biases the piston towards the servo cylinder head member 96. A sleeve 108 axially aligned with the center perforation of the member 100 and secured thereto serves as a piston stop member and as an internal spring guide.

When the servo mechanism is connected to the fluid pressure source by the control valve 26, the piston is shifted to the right against the sleeve stop 108 moving the link-carried pin 86 into engagement with the spring end 68. When the application of fluid pressure to the mechanism is discontinued, the piston 102 and the link 84 are returned by the springs 106 and 64, respectively.

Figure 5:
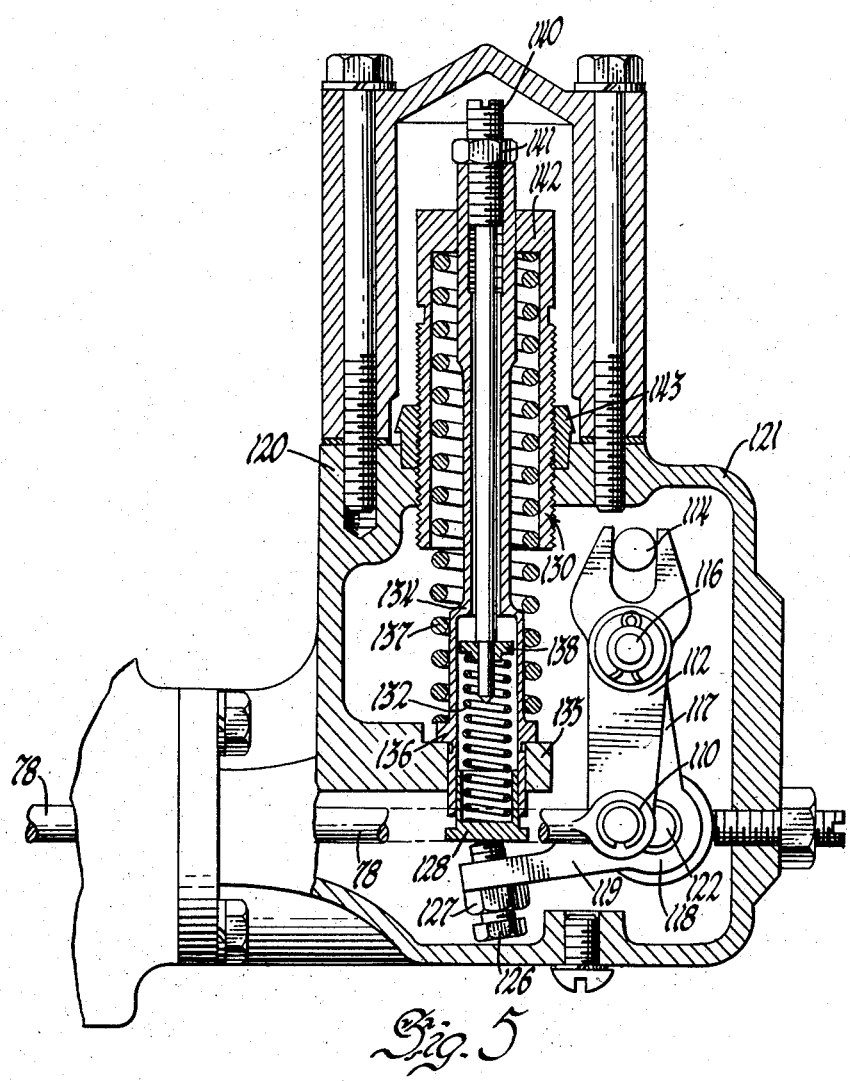
Figure 5 is a fragmentary sectional view taken substantially on the line 5—5 of Figure 4 with other portions thereof broken away and in section.

The end of the fuel control member 78 distal from the pivotal connection 76 is pivotally connected at 110 to one arm of a differential fuel control lever 112. The fuel control lever 112 is operably connected to an engine governor mechanism which is adapted to regulate the fuel controlling movements of the lever 112 to limit the minimum and maximum speed operating limits of the engine. The governor mechanism is generally designated by the reference numeral 120. The fuel control lever 112 is also operably connected to a manually operable throttle control linkage generally designated by the reference numeral 150. The throttle control linkage is normally operable between engine-idle and wide-open throttle positions and is normally effective to move the lever 112 to control the speed of the engine between the governor established speed limits. As best seen in Figure 5, the lever 112 is pivotally connected at 116 intermediate its ends to an arm 117 of a speed-responsive bell crank lever 118 of the engine governor mechanism, and the end of the lever 112 opposite the pivot 110 has a slotted pivotal connection with a throttle control lever-carried pin 114 of the throttle control linkage mechanism.

The engine governor mechanism 120 for each engine is shown, for illustrative purposes, as a conventional limiting speed governor. However, the governor mechanism may be of other well-known types; and where the power plant is utilized to propel a motor vehicle, the governor mechanism is preferably of the improved limiting-speed type governor disclosed in United States patent application S.N. 426,868, entitled "Control Mechanism" and filed April 3, 1954, now Patent No. 2,771,788 issued November 27, 1956, in the names of Charles Frick and Glen R. Hickson.

A second arm 119 of the bell crank lever 118 is provided with a nut-lock adjusting screw 126 threadably mounted therein. The screw 126 is in endwise thrust engagement with a spring cap 128 of a governor speeder spring assembly 130 which tends to rotate the bell crank lever 118 in a counterclockwise direction. Such rotation of the lever 118 causes the lever 112 to rotate in a clockwise fuel-increasing direction. The spring cap 128 is reciprocably mounted within a cylindrical bore provided in a high-speed plunger element 134 and forms a seating member for a low-speed speeder spring 132. The element 134 is in turn reciprocably mounted in an opening provided in a web 135 formed within the governor housing 121. A flange 136 formed on the plunger element 134 forms a spring seat for one end of the high-speed speeder spring 137. The flange 136 also limits the axial movement of the plunger in a fuel-increasing direction so that a minimum engine speed gap is provided between the cap 128 and the end of the high-speed plunger 134. This gap is shown in Figure 5 and is the distance which the cap 128 can move axially in a fuel-decreasing direction before the flange formed thereon engages the end of the plunger 134. As explained in detail below, this gap permits the low-speed spring 132 to maintain the speed of the engine above a desired minimum value. The other end of the low-speed speeder spring 132 is seated against a washer 138 which is carried by a low-speed speeder spring adjusting screw 140. The screw 140 is in turn carried by the distal end of the high-speed plunger 134 which is reciprocably mounted in a bore provided in a high-speed speeder spring retaining cap 142. The retaining cap 142 serves as a seat for the opposite end of the high-speed speeder spring 136 and is externally threaded to engage the internal threaded opening provided in the governor housing 121 to provide for adjustment of the high-speed speeder spring. The speeder spring adjusting members 140 and 142 and the adjusting screw 126 are respectively provided with suitable lock nuts 141, 143, and 127.

Intermediate its arms 117 and 119, the bell crank lever 118 of the governor mechanism 120 is secured to the upper end of a governor output shaft 122 which is rotatably journaled in the governor housing 121. A conventional engine-driven limiting-speed centrifugal flyweight mechanism 123 is operably connected to the lower end of the governor output shaft 122. The centrifugal mechanism 123 includes low- and high-speed centrifugal weights 124 and 125, respectively, which are adapted to swing radially outwardly in opposition to the governor speeder spring assembly 130 when the engine exceeds minimum and maximum engine speed limits established by the speeder spring assembly. When centrifugal forces acting on the flyweight mechanism 123 cause the weights 124 and 125 to move radially outwardly, the shaft 122 and the bell-crank-lever-carried pivotal connection 116 are rotated in a clockwise direction, as viewed in Figure 5. Such rotation, in opposition to the speeder spring assembly, imparts a counterclockwise rotation to the lever 112 causing the fuel control member 78 to move in a fuel-decreasing direction.

Figure 6:
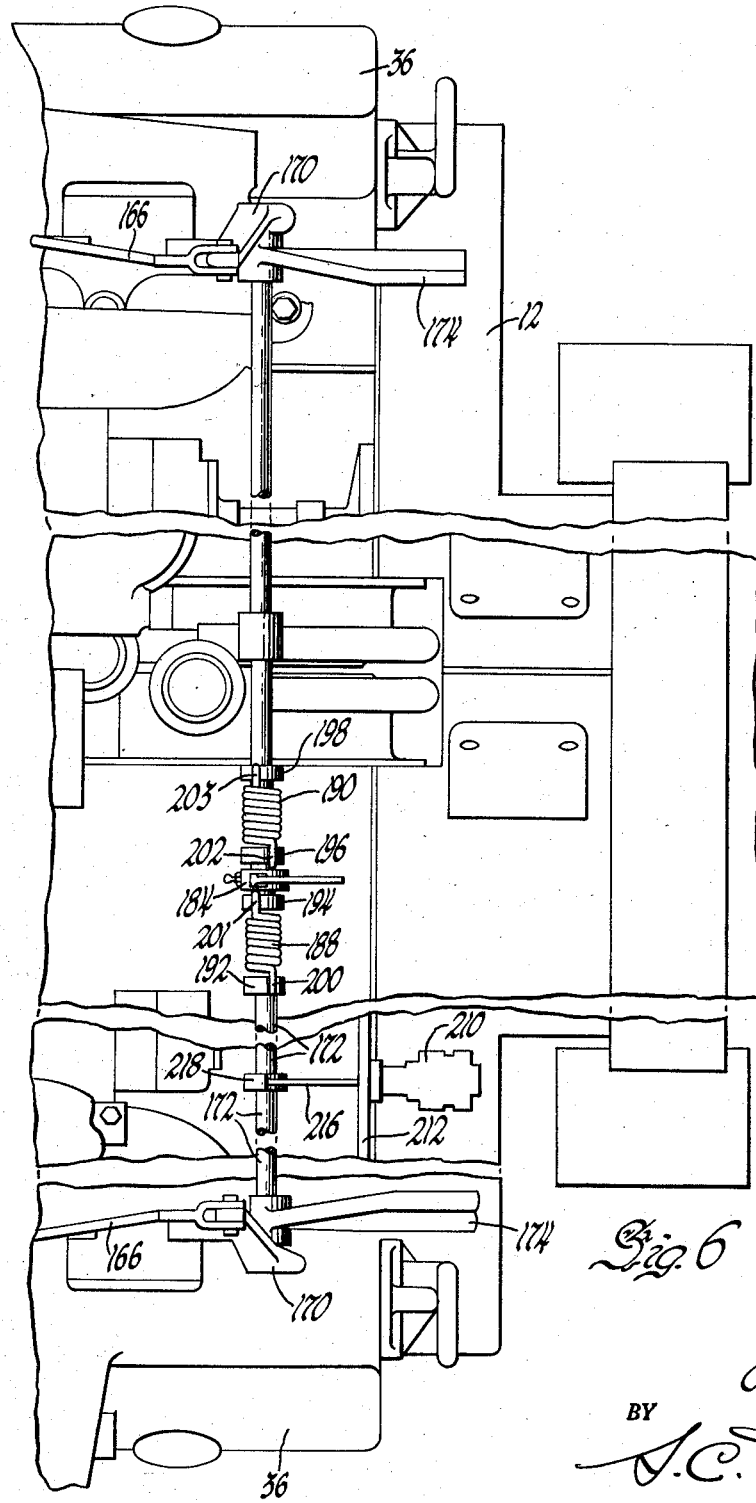
Figure 6 is a fragmentary elevational view of a portion of the engine throttle control linkage taken in the direction of the arrows 6—6 of Figure 1.

The pin 114 which forms the pivotal connection with the differential fuel-controlling lever 112 is carried by a lever arm 151 which is secured to the lower end of a throttle control shaft 152. The throttle control shaft is rotatably journaled in the governor housing cover 154. A second lever arm 156 mounted on the upper end of the throttle control shaft 152 is provided with a pin-mounted cam follower 158 which is adapted to engage an internal cam formed in a throttle control cam plate 160 pivotally mounted on the housing cover 154, as indicated at 161. A third lever arm 162 mounted on the upper end of the throttle control shaft 152 is pivotally connected at 164 to a link 166 extending longitudinally of the engine. The distal end of the link 166 is pivotally connected at 168 to a lever arm 170 mounted on the end of a cross shaft 172. The cross shaft 172 is rotatably mounted by the brackets 174 and extends transversely of the power plant to operably interconnect the fuel control linkages of the two engines. A manual control 180, such as an accelerator pedal or throttle handle, is operably connected to the cross shaft 172 by a suitable linkage 182 including a lever 184 which is rotatably mounted on the cross shaft 172 intermediate its ends and resiliently connected thereto. The resilient connection provided between the lever 184 and the cross shaft 172 is best seen in Figure 6 and comprises two helically wound springs 188 and 190 embraceably mounted on the cross shaft 172. The springs 188 and 190 are prestressed to a desired value by torquing their ends 200, 201 and 202, 203 between lever arms 192, 194 and 196, 198, respectively, spacedly secured to the cross shaft 172, and their inner ends 201 and 202 extend to abut the lever 184 fore and aft.

An expansible chamber servo mechanism 210 mounted on one of the engines by a bracket 212 is operable to insure that the accessory load mechanism 18 will not be driven at an excessive speed while the secondary transmission mechanism 20 is in overdrive operation. The servo-mechanism 210 is connectable through the conduit 214 and the accessory control valve 26 to the fluid pressure source when the control valve is in the operative position establishing overdrive operation of the transmission 20. When the servo mechanism 210 is thus actuated, an output rod 216 thereof is shifted to engage a lever arm 218 secured to the cross shaft 172 to thereby carry the throttle control linkage 150 to an engine idle- or low-speed setting. Such energization of the servo mechanism 210 also renders the manual control element 180 inoperative to actuate the cross shaft and other portions of the throttle control linkage from the low-speed position since any movement of the element 180 is absorbed by the resilient connection provided by the springs 180 and 190 between the cross shaft 172 and the lever 184.

In the internal combustion engine power plant described above, the power plant is utilized primarily as the propelling means for a conveyance and secondarily as the driving means for the relatively high-load capacity accessory load mechanism 18 which is adapted to be selectively driven by the power plant. To provide for relatively high-speed high-output stand-by operation of the accessory load mechanism when the power plant is not being utilized to drive the conveyance, the two-speed transmission 20 is provided. The drive ratios of the transmission mechanism 20 are such that the accessory mechanism will be driven at its rated speed when the engine is operating at its controlled idling speed with the transmission in overdrive operation or when the engine is operating at its maximum speed with a direct drive connection established through the transmission mechanism.

As indicated above, the various drive connections through the transmission 20 are established by placing the manually operable accessory drive control linkage 28 in the *d, e,* and *f* positions which shifts the control valve to establish direct-drive, no-drive, and overdrive connections, respectively. However, to insure that the operator does not inadvertently increase the engine speed above idle when the control valve 26 is placed in its overdrive-establishing position, the control valve 26 also serves to actuate the servo mechanism thereby rendering the operator throttle control 180 inoperative to shift the portions of the fuel-controlling linkage 150 which are connected to the engine fuel-controlling means through the governor housing. Such an interlock control is necessary to protect the accessory mechanism from destructive overspeed operation.

The engine governors 120 are each individually operable to maintain the speed of their respective engines at desired minimum idle speeds under no-load conditions. The adjusted spring rate of the low-speed speeder spring 132 of each governor is sufficient to maintain the low-speed centrifugal weights 124 in their collapsed condition, and consequently the differential lever 112 and the fuel control member 78 in their maximum idle-speed fuel-supplying positions relative to the throttle control pin 114, until the desired minimum idle speed has been achieved. At the desired minimum engine speed, the centrifugal forces acting on the low-speed weights are sufficient to overcome the biasing effect of the spring 132, and the resulting outward swinging of the weights rotates the shaft 122 and lever 118 in a clockwise direction thereby rotating the fuel-controlling differential lever 112 in a counterclockwise direction with respect to the throttle control pin 114 to decrease the fuel supply to the engine until a condition of equilibrium is established between the centrifugal and speeder spring forces applied to the bell crank lever 118 thereby maintaining the engine at the desired idle speed.

For economy, the speed differential between the normal no-load governor-maintained engine idle speed and the stall speed of the engine should be sufficient to accommodate speed fluctuations resulting from variations in the parasitic loads and fuel supply of the engine which would tend to droop the engine speed into a relatively unstable speed range immediately above the engine stall speed. However, the speed characteristics of an internal combustion engine are such that the upper speed limit at which such unstable operation occurs increases as a function of the imposed load. Consequently, the application of the relatively high stand-by load of the accessory mechanism 18 to the driving engine or engines while the engines are operating at their normal idling speeds would tend to droop the speed of the engines into their unstable operational range or even below the stall speed of the engine. It should also be noted that the limiting-speed governors will respond to increase the engine fuel supply to maintain the engines above their stall speed only after the engine speed has drooped to where the low-speed weights have collapsed inwardly.

To prevent engine stalling when the accessory mechanism is being driven by the idling power plant through the transmission overdrive connection provided for stand-by operation, the invention contemplates the use of the servo mechanism 90 which is connected to the fluid pressure source by the control valve 26 when the valve is placed in its overdrive-establishing position. Actuation of the servo mechanism 90 causes the link 84 to apply the couple of the torsion spring 64 to the injector control tube 50 in the manner described above thereby effectively increasing the low-speed biasing action of the governor; the couple being effectively added to the low-speed speeder spring 132. The resultant increased biasing of the fuel control linkage causes the immediate collapse of the centrifugal weights 124 before the full stand-by load of the accessory mechanism is placed on the engine thereby increasing the governor response. The increased low-speed biasing action also advances the governor-controlled idle speed to a value at which the accessory load may be driven at approximately its rated speed through the overdrive transmission connection without droopage of the engine speed into the undesirable unstable low-speed range of the engine.

As indicated above, the throttle control linkage 150 will normally be effective to control the operative position of the differential lever 112 and thereby the speed of the engine between the minimum and maximum engine speed limits established by the governor 120, except when the overdrive driving connection of the accessory mechanism 18 is established. The adjusted spring rate of the high-speed speeder spring 137 of each engine governor is sufficient to maintain the high-speed centrifugal weights 125 in their collapsed condition until the desired maximum engine speed has been achieved. At the desired maximum engine speed, the centrifugal forces acting on the high-speed weights are sufficient to overcome the biasing effect of the spring 137. The resulting outward swinging of the weights rotates the shaft 122 and the lever 118 in a clockwise direction thereby rotating the fuel-controlling differential lever 112 in a counterclockwise fuel-supply-decreasing direction. This fuel-supply-decreasing rotation continues until a condition of equilibrium is established between the centrifugal and speeder spring forces acting on the fuel-controlling linkages. When such a condition of equilibrium has been achieved, the engine is maintained at its desired maximum speed.

While only one specific embodiment of the invention has been shown and described for the purposes of illustration, it will be appreciated that various modifications may be made without departing from the spirit and scope of the invention as defined in the following claims.

I claim:

1. In a power plant including an engine, primary transmission mechanism adapted to connect said engine to a primary load, a secondary transmission mechanism adapted to connect said engine to a secondary load, and means for selectively establishing independent driving connections between said engine and said loads through the transmission mechanisms, control mechanism comprising, in combination, a fuel control member adapted to control the fuel delivered to the engine, a limiting-speed governor associated with said fuel control member and operable thereon to limit the minimum and maximum speeds of said engine, manual control means operably connected to said fuel control member and said governor and normally operable on said member to control engine speed between said governor-controlled limits, governor control means responsive to said drive connection establishing means to effect changes in the minimum speed setting of said governor in accordance with the driving connections established, and a second means operable in response to said drive connection establishing means in one operative position thereof to render said manual control means inoperative to shift said governor and said fuel control member from their minimum engine speed positions.

2. A control mechanism for a power plant including an engine, a primary transmission mechanism adapted to connect said engine to a primary load, a secondary transmission mechanism adapted to connect said engine to a secondary load, and means for individually and selectively establishing independent driving connections between said engine and said loads through said transmission mechanisms, said control mechanism comprising, in combination, engine fuel control means, manual control means operably connected to said fuel control means and movable between an idle and a full throttle position, governor means associated with said fuel control means and operable thereon to limit the minimum and maximum speeds of the engine, governor control means responsive to said drive connection establishing means to effect changes in the minimum speed setting of said governor in accordance with the load-driving connections established, and means operable in response to said drive connection establishing means in one operative position thereof to render said manual control means inoperative to actuate said fuel control means from an engine idle position.

3. In a power plant for a conveyance including an engine, a primary transmission mechanism adapted to connect said engine to a conveyance propelling mechanism, a secondary transmission mechanism adapted to connect said engine to at least one conveyance accessory mechanism, and means for establishing independent driving connections through said transmission mechanisms between said engine and said conveyance mechanisms, a control mechanism comprising, in combination, a fuel control member operable to control the fuel delivered to said engine, manual control means operably connected to said fuel control member and normally operable between an idle and a full throttle position to control the speed of the engine, governor means operably associated with said fuel control member and operable to modify the fuel supply controlling movement of the fuel control member by said manual control means to limit the minimum and maximum speeds of said engine, automatic control means responsive to said drive connection establishing means to effect an increased minimum speed setting of said governor when the drive connection between said engine and said accessory mechanism is established, and a second automatic control means operable in response to said drive connection establishing means in one operative position thereof to render said manual control means incapable of shifting said fuel control member.

4. Control mechanism for a motor vehicle including an internal combustion engine power plant, primary transmission mechanism adapted to connect said power plant to vehicle propulsion mechanism, and secondary transmission mechanism adapted to connect said power plant to at least one vehicle load accessory mechanism, and means for independently and selectively establishing driving connections between the power plant and each of said vehicle mechanisms, said control mechanism comprising, in combination, fuel control means operable to control the engine fuel supply of the power plant, governor means associated with said fuel control means, said governor means including biasing means urging said fuel control means in a maximum fuel direction and speed responsive means coacting on said fuel control means against said biasing means to limit the minimum and maximum speeds of said power plant, manual control means operably connected to said fuel control means and normally operable thereon between an idle and a full throttle position to effect changes in engine speeds between said governed speed limits, and means responsive to the drive connections established by said drive connection establishing means to effectively change the cooperative fuel controlling relation between the governor, the fuel control means, and the manual control means in accordance with the vehicle mechanisms drivingly connected to the power plant by the drive connection establishing means and effective in one operative condition of the drive connection establishing means to render said manual control means incapable of actuating said fuel control means.

5. The combination set forth in claim 4 in which said drive connection responsive means includes a first means responsive to said drive connection establishing means to effectively vary the biasing means of said governor to change the minimum speed setting of the governor in accordance with the vehicle mechanisms drivingly connected to the power plant, and a second means operable in one operative position of the drive connection establishing means to render said manual control means incapable of actuating said fuel control means from an engine idle control position.

6. Control mechanism for a motor vehicle including an internal combustion engine power plant, primary transmission mechanism adapted to connect said power plant to vehicle propulsion mechanism, and secondary transmission mechanism adapted to connect said power plant to at least one vehicle load accessory mechanism, and means for independently and selectively establishing driving connections between the power plant and each of said vehicle mechanisms, said control mechanism comprising, in combination, fuel control means operable to control the engine fuel supply of the power plant, governor means associated with said fuel control means, said governor means including biasing means urging said fuel control means in a maximum fuel direction and speed responsive means coacting on said fuel control means against said biasing means to limit the minimum and maximum speeds of said power plant, manual control means operably connected to said fuel control means and normally operable thereon between an idle and a full throttle position to effect changes in engine speeds between said governed speed limits, and means responsive to said drive connection establishing means to effectively change the minimum power plant speed maintaining relationship between the governor, the fuel control means, and the manual control means in accordance with the vehicle mechanisms drivingly connected to the power plant.

7. The combination set forth in claim 6 in which said drive connection responsive means includes means operable in one operative condition of the drive connection establishing means to render said manual control means incapable of actuating said fuel control means from an idle control position.

8. A control mechanism for a power plant comprising, in combination, means selectively operable to independently and collectively connect a plurality of load mechanisms to the power plant, manually operable control means normally effective to control the speed of the power plant, governor means providing overriding regulation of said control means to limit the maximum speed of the power plant, secondary governor means associated with said first governor means and providing overriding regulation of said control means to tend to maintain the speed of the power plant above a minimum value, and means responsive to the selective operation of said load connecting means to vary the operation of said second governing means to maintain different minimum power plant speeds in accordance with the operation of said load connecting means to drivingly connect different load mechanisms to the power plant.

9. In an internal combustion engine power plant, a control mechanism comprising, in combination, means operable to individually and collectively connect a plurality of load mechanisms to said engine, engine fuel control governor means adapted to regulate the maximum speed of the engine, and means associated with said governor means and responsive to the selective operation of said connecting means for establishing minimum speed regulation of the engine at different governed minimum speeds in accordance with the operation of said connecting means to drivingly connect different load mechanisms to said power plant.

10. A control mechanism for an internal combustion engine adapted to drive a plurality of load mechanisms, means associated with said engine and operable to individually and collectively connect said load mechanisms to the engine, fuel control means normally effective to control engine speed, governor means adapted to override said linkage means to regulate maximum and minimum engine speed, and means associated with said governor means and responsive to the operation of said load connecting means for effectively changing the minimum speed regulation of said governor between different minimum speed limits in accordance with the operation of said load connecting means to drivingly connect different load mechanisms to the engine.

11. In a power plant having a primary loading mechanism and a secondary loading mechanism, control means selectively operable to individually and selectively establish independent driving connections between said engine and each of said loading mechanisms, power plant speed control means including a manual control normally operable to control the speed of the power plant, said speed control means also including limiting speed governing means operable to provide overriding regulation of said manual control to maintain minimum and maximum speed limits for said power plant, and means responsive to the selective operation of said driving connection establishing control means to vary the minimum speed limit maintained by said governor in accordance to the operation of said driving connection establishing control means.

12. A control mechanism for a power plant including an engine, a primary loading mechanism and a secondary loading mechanism, said control mechanism comprising control means for individually and selectively establishing independent driving connections between said engine and said primary and said secondary loading mechanism, a fuel control mechanism associated with said engine and operable to control the speed thereof, said fuel control mechanism including limiting speed governing means operable to establish minimum and maximum speed limits for said engine, and means responsive to said driving connection control means to increase the minimum speed limit of said governing means when the secondary loading mechanism is drivingly connected to the engine by said connection establishing means.

13. In a power plant including an engine, a transmission mechanism adapted to drivingly connect said engine to a load, and a second transmission mechanism adapted to drivingly connect said engine to a second load, control mechanism comprising, in combination, means for selectively establishing a driving connection between said engine and said second load through said second transmission mechanism independently of the driving connection through said first-mentioned transmission mechanism, a fuel control member adapted to control the fuel delivered to the engine, a governor associated with said fuel control member and operable thereon to limit the minimum speed of the engine, manual control means operably connected to said fuel control member through said governor and normally operable on said member between idle and wide-open-throttle positions to control engine speed above said governor controlled minimum, governor control means responsive to the drive connection establishing means to effect changes in the minimum speed setting of said governor in accordance with the driving connection established between the engine and said second load, and means operable in response to said drive connection establishing means in one operative position thereof to render said manual control inoperative to shift said governor and said fuel control member from their minimum engine speed positions.

14. A control mechanism for a power plant including an engine, a transmission mechanism adapted to connect said engine to a load, a second transmission mechanism adapted to connect said engine to a second load and including means for selectively establishing the drive ratio through said second transmission mechanism, said control mechanism comprising, in combination, engine fuel control means, manual control means operably connected to said fuel control means and movable between an idle and a full-throttle-position, governor means associated with said fuel control means and operable thereon to limit the minimum speed of the engine, governor control means responsive to the drive ratio establishing means of said second transmission to effect changes in the minimum speed setting of said governor in accordance with the drive ratio established, and means operable in response to said drive ratio establishing means in one operative position thereof to render said manual control means inoperative to actuate said fuel control means from an idle position.

15. Control mechanism for a power plant including a plurality of transmission means selectively operable to establish independent driving connections between said power plant and a plurality of load mechanisms, manually operable control means normally effective to control the speed of the power plant, governor means for providing overriding regulation of said control means tending to maintain the speed of the power plant above a minimum value, and means responsive to the selective operation of one of said transmission means for effecting alternative minimum speed maintaining response settings of said governor means in accordance with the operation of said one transmission means.

16. Control mechanism for a power plant including, in combination, transmission means for independently connecting a plurality of load mechanisms to the power plant, drive ratio selecting means for at least one of said transmission means, manually operable control means normally effective to control the speed of the power plant, governor means providing overriding regulation of said control means to tend to maintain the speed of the power plant above a minimum value, and means responsive to said drive ratio establishing means of said one transmission means for varying the minimum speed maintaining response of said second governing means in accordance with the drive ratio established for said transmission means.

17. In an internal combustion engine power plant, a control mechanism comprising in combination a plurality of transmission means for individually establishing independent driving connections between said engine and a plurality of load mechanisms, at least one of said transmission means including drive ratio selecting means, engine fuel control governor means adapted to regulate the maximum speed of the engine, and means associated with said governor means for establishing minimum speed regulation of the engine in accordance with the drive ratio established through said one transmission means by said drive ratio establishing means.

18. A fuel control mechanism for an internal combustion engine adapted to drive a plurality of load mechanisms through separate transmission mechanisms, at least one of said transmissions being provided with drive ratio selecting means, said fuel control mechanism including, in combination, fuel control means normally effective to control engine speed, governor means adapted to override said fuel control means to regulate maximum and minimum engine speed, and means associated with said governor means and responsive to the drive ratio establishing means of said one transmission means for effectively varying the minimum speed regulation of said governor in accordance with the drive ratio established through said transmission means.

19. In a power plant having primary loading mechanism and secondary loading mechanism drivingly connectable thereto, a plurality of means for establishing independent driving connections between said engine and each of said loading mechanisms, power plant speed control means including a manual control normally operable to control the speed of the power plant and limiting speed governing means operable to provide overriding regulation of said manual control to maintain desired minimum and maximum speeds for said power plant, means responsive to one of said driving connection establishing means to modify the minimum speed regulation of said governor in accordance with the driving connection established by said driving connection establishing means, and means responsive to said drive connection establishing means in one operative position thereof to render said manual control inoperative to control the speed of the power plant.

20. A control mechanism for a power plant including an engine, a primary loading mechanism and a secondary loading mechanism and transmission mechanisms for establishing independent driving connections between said primary and said secondary loading mechanisms, said control mechanism including control means for selectively establishing a plurality of drive ratios between said engine and one of said loading mechanisms through one of said transmission mechanisms, a fuel control mechanism associated with said engine and operable to control the speed thereof, said fuel control mechanism including governing means operable to maintain minimum speed limits for said engine, and means responsive to said driving connection control means to increase the minimum speed limit of said governing means in accordance with the drive ratio established by said control means.

References Cited in the file of this patent

UNITED STATES PATENTS 1,235,719     Newcomb et al. _____ Aug. 7, 1917